United States Patent Office 2,871,276

Patented Jan. 27, 1959

1

2,871,276

POLYMERIZATION OF ALPHA OLEFINS IN THE PRESENCE OF AN $AlR_3$ CATALYST

James R. Eiszner, Park Forest, Ill., assignor to Standard Oil Company, Chicago, Ill., a corporation of Indiana No Drawing. Application August 11, 1954
Serial No. 449,274

15 Claims. (Cl. 260—683.15)

This invention relates to an improvement in processes for the polymerization of olefins with catalysts comprising essentially a compound having the formula $AlR_3$ wherein R is selected from the class consisting of hydrogen and monovalent hydrocarbon radicals. Polymerization processes utilizing $AlR_3$ catalysts are well known, having been explored in some detail by Karl Ziegler and his associates (note, for example, German Patent 878,560 published June 5, 1953; Angew. Chem., 64, No. 12, 323–9 (June 21, 1953); and Brenn. Chem., 33, Nos. 11/12, 193–200 (June 25, 1952)). From the commercial standpoint the known processes have suffered from the relatively low rate of olefin polymerization which imposes the necessity of using large amounts of the expensive $AlR_3$ catalysts to obtain desirable polymer outputs per unit of time.

One object of my invention is to provide an improved process for the polymerization of certain olefins in the presence of $AlR_3$ catalysts. Another object of my invention is to provide a method for increasing the rate of polymerization of certain olefins in the presence of $AlR_3$ catalysts. Still another object is to provide a process for the polymerization of various olefins in the presence of reduced amounts of $AlR_3$ catalysts without sacrifice in the rate of olefin polymerization. An additional object is to provide a novel combination of catalytic materials for the polymerization of olefins. These and other objects of my invention will become apparen tfrom the following description thereof.

A remarkable increase in the rate of olefin polymerization may be obtained when copper or silver is employed as a promoter, synergist or co-catalyst with $AlR_3$ catalysts, as will be apparent from the specific examples of my invention, which are related hereinafter. I may also employ various alloys comprising copper, silver or both of these metals. Admixtures of copper and silver may also be employed.

2

The examples are illustrative of my invention and are not intended as undue limitations thereof. In performing the examples, I employed a stainless steel-lined autoclave (500 cc.) provided with a reciprocating magnetic stirrer, known as a Magne-Dash reactor. In each example the autoclave was charged with about 2 to 4 grams of lithium aluminum hydride (variable from trial to trial) and 30 cc. of benzene solvent. Rate data are reported in Table 1 for ethylene polymerization operations conducted at 188° C. and ethylene partial pressure of about 3500 p. s. i. Ethylene was added incrementally during the operations to maintain the operating pressure. Upon completion of the polymerization runs, the autoclaves were cooled to room temperature and gases were vented to atmospheric pressure, following which liquid olefin products were removed from the reactor by vacuum distillation. The following data were obtained:

*Table 1*

| Run | Added Material | | | | Total Area, $m.^2$ | Relative Rate | |
|---|---|---|---|---|---|---|---|
| | | g./g. $LiAlH_4$ | d(g./cc.) | Surface Area, $m.^2/g.$ | | dP/hr./g. $LiAlH_4$, Rate in Run 1 | lb. product/hr./lb. $LiAlH_4$ |
| 1 | none | ---------- | ---------- | ---------- | ---------- | 1.0 | 1.5 |
| 2 | glass wool | 3.12 | 2.3 | <1.6 | <5 | 1.36 | 2.0 |
| 3 | Al dust | 4.8 | 2.7 | 12.5 | 60 | 1.9 | 3.0 |
| 4 | Cu powder | 5.7 | 8.9 | 0.72 | 4.1 | 4.1 | 6.2 |
| 5 | Ag powder | 5.6 | ---------- | 1.2 | 6.7 | 2.1 | ---------- |

It will be noted from the data of Table 1 that glass wool and aluminum dust exerted "wall effects," increasing the rate of ethylene polymerization. The copper and silver, in spite of low surface area, caused the largest polymerization rate increases and are believed to function as co-catalysts or synergists for the $LiAlH_4$ or the lithium aluminum alkyls which are formed in the reactor.

In Table 2 are presented detailed data obtained in the polymerization of ethylene in the presence of lithium aluminum hydride and copper powder.

*Table 2*

| | |
|---|---|
| Catalyst | 1.0 g. LAH[1] Cu powder in 20 cc. benzene. |
| Time, hrs. | 13.2. |
| Average temp., ° C. | 203. |
| Average press., p. s. i. | 3500. |
| G. total product/G. catalyst | 147.1. |
| Approximate composition (vol. %) of debutanized product: | |
| $C_6$ | 27. |
| $C_8$ | 26. |
| $C_{10}$ | 20. |
| $C_{12}$ | 15. |
| $C_{14}$ | 4. |
| Percent condensable gas | 20.4. |
| Percent liquid products | 75.9. |
| Percent bottoms on distillation of liquid from catalyst | 3.7. |

[1] Lithium aluminum hydride.

The products produced in the above run were almost entirely terminal mono-olefins of straight-chain structure.

Although in the above examples certain specific embodiments of my invention are described, it will be understood that it is of far broader scope. The invention will be described in more detail hereinafter.

In the $AlR_3$ catalysts, the R substituents may be the same or different, and they are selected from the group consisting of hydrogen and monovalent hydrocarbon radicals. Examples of suitable R groups include an aryl radical, aliphatic hydrocarbon radical or derivative, viz, alkyl, cycloalkyl-alkyl, cycloalkenyl-alkyl, arylalkyl, cycloalkyl, alkyl-cycloalkyl, aryl-cycloalkyl, cycloalkyl alkenyl, alkyl-aryl or cycloalkyl-aryl radicals.

Specific examples of R groups include:

Methyl, ethyl, n-propyl, isopropyl, isobutyl, n-amyl, isoamyl, hexyl, n-octyl, n-dodecyl, and the like;
2-butenyl, 2-methyl-2-butenyl and the like;
Cyclopentyl-methyl, cyclohexyl-ethyl, cyclopentyl-ethyl, methylcyclopentyl-ethyl, 4-cyclohexenylethyl and the like;
2-phenylethyl, 2-phenylpropyl, β-naphthylethyl, methylnaphthylethyl, and the like:
Cyclopentyl, cyclohexyl, 2,2,1-bicycloheptyl, and the like;
Methylcyclopentyl, dimethylcyclopentyl, ethylcyclopentyl, methylcyclohexyl, dimethylcyclohexyl, ethylcyclohexyl, isopropylcyclohexyl, and the like;
Phenylcyclopentyl, phenylcyclohexyl, the corresponding naphthyl derivatives of cycloalkyl groups, and the like;
Phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

The $AlR_3$ catalyst is advantageously employed in the form of compounds having the general formula $M(AlR_4)_n$ wherein M is a metal and $n$ is its valence, R having the definition aforesaid. The metal M is preferably an alkali metal, for example, lithium, sodium or potassium, or an alkaline earth metal, namely, beryllium, magnesium, calcium, strontium, or barium. When compounds containing an aluminum-hydrogen bond are employed as catalysts for olefin polymerization, they are converted during the polymerization process to aluminum alkyls. Aluminum alkyls and metallo-aluminum alkyls such as lithium aluminum alkyls exhibit substantial solubility in the olefin polymer product under the reaction conditions. Olefin polymers thus constitute a suitable polymerization reaction medium.

The preferred catalysts of this invention are lithium aluminum hydride, lithium aluminum alkyls or compounds of intermediate structure having the formula $LiAlH_nR_{4-n}$, wherein $n$ has a value of 1 to 3. The lithium aluminum alkyls can be readily prepared, within or outside the polymerization reaction zone, by the methods described by Ziegler (infra) or otherwise. Thus, lithium aluminum hydride (0.25 mol) and 1-octene (1.32 mols) were heated in a nitrogen atmosphere for 3 hours at 125 to 138° C. and excess octene was thereafter stripped from the reaction mixture under vacuum at temperatures below 135° C. This synthesis was found to yield 0.23 mol of lithium aluminum tetra-1-octyl. It will be understood that methods for the preparation of the $AlR_3$ catalysts, per se, do not constitute a part of the present invention and that these catalysts may be used for the purposes of this invention regardless of the method by which they are synthesized.

The copper or silver synergists or co-catalysts may be employed in various forms. In general, it is most desirable to employ copper or silver in a form which presents as large a surface to the reaction mixture as possible. Although copper or silver may be employed in the form of lumps, coarse granules, shot or gauze, I prefer to employ them in the form of a powder, e. g. of about 200 mesh per inch or finer. Copper or silver having a large surface area can be prepared by supporting them upon solid supporting or diluent materials, such as charcoal and the like. I may employ porous or skeletal copper which can be prepared by methods known in the art, for example, by leaching copper-silicon or copper-aluminum alloys with phenols or with alkalies such as sodium hydroxide, sodium carbonate, and the like, to remove part or all of the leachable metal which is alloyed with the copper.

The minimum ratio of copper or silver to the $AlR_3$ catalyst should be at least about 0.25 gram atom per mol of the $AlR_3$ catalyst. I can use between about 0.5 and about 10 gram atoms of copper or silver per mol of $AlR_3$.

The present process may be applied to any olefin which can be polymerized by $AlR_3$ catalysts. The olefinic hydrocarbon feed stocks usually employed are alpha-olefins having at least one hydrogen atom attached to the beta carbon atom, as in the following formula

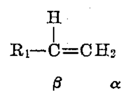

wherein $R_1$ is hydrogen or a monovalent hydrocarbon radical, for example, a saturated hydrocarbon radical or an aryl radical (such as the R radicals specified above in the definition of the $AlR_3$ catalyst), a cycloalkenyl radical such as 4-vinylcyclohexenyl, and the like; an alkenyl radical, for example, as in olefins such as 1,3-butadiene, isoprene, 1,5-hexadiene, and the like. At the present time, the olefinic charging stock which appears most attractive is ethylene, which can be polymerized at a commercially attractive rate by the process of the present invention to produce a series of polymers having a degree of polymerization ranging from 2 to 20 or more. Ethylene polymerization can be controlled to yield a product of which 60 to 75% is composed of polymers ranging from 1-hexene to 1-hexadecene. Olefins such as propylene, 1-butene, 1-pentene, 1-hexene, and the like are converted principally to dimers by the process of the present invention. Copolymers may be prepared by using mixtures of olefins as feed stocks The olefinic feed stock and liquid reaction medium should be freed as far as possible of catalyst inhibitors and poisons, e. g., water, oxygen, carbon dioxide, sulfur compounds, acetylene, aldehydes and other substances which react with the $AlR_3$ catalyst to reduce its polymerization efficiency.

It is desirable to initiate the polymerization reaction in the presence of a reaction medium which serves to absorb the heat initially generated by the polymerization reaction and by the alkylation of the $AlR_3$ catalyst, which occurs when at least one of the R groups in said catalysts is hydrogen. The reaction medium may consist of or comprise a liquid hydrocarbon which does not interfere excessively with the desired polymerization reaction, for example a saturated hydrocarbon such as n-pentane, n-octane, cyclohexane, or the like; an aromatic hydrocarbon such as benzene, toluene, xylenes, or the like; olefinic hydrocarbons, especially those which do not contain a terminal double bond or olefins of tertiary (isobutylene-type) structure, e. g., 2,4,4-trimethyl-1 or 2-pentene, cyclohexene, 2-methyl-1-butene, 2-methyl-1-pentene or the like. The reaction medium may also consist of or comprise various ethers such as diethyl ether, methyl isopropyl ether, isopropyl ether, dibutyl ether, tetrahydrofuran, dioxane, or the like.

The process of the present invention can be practiced over an extremely broad range of temperatures and pressures, as heretofore employed in the polymerization of olefins in the presence of $AlR_3$ catalysts. The specific conditions of polymerization will be suitably varied, as will be appreciated by those skilled in the art, depending upon the identity of the particular catalyst, olefinic hydrocarbon charging stock, catalyst concentration, identity and proportion of liquid reaction medium, efficiency of contacting of the components of the reaction mixture in the reaction zone, the reaction period, desired product distribution, etc.

In general, $AlR_3$ catalysts are known which function as catalysts for the polymerization of olefins over the temperature range of about 80° C. to about 250° C. Catalysts such as aluminum triethyl are usually employed at temperatures of at least about 100 to 120° C. and may be employed with copper or silver co-catalysts at temperatures in the range of about 75 to 120° C. or higher. Catalysts such as lithium aluminum hydride and lithium aluminum alkyls can be employed at temperatures within the range of about 180 to about 250° C.

The olefin partial pressure can affect the polymerization rate and, especially in the case of ethylene polymerization, the product distribution. Thus, the polymerization of ethylene at atmospheric pressure yields 1-butene as the principal product, whereas at higher pressures products of higher molecular weight are formed. In order to produce large yields of normally liquid polymers from ethylene, it is commercially desirable to employ pressures above about 2500 p. s. i., preferably about 3000 to 4000 p. s. i. Higher ethylene pressures above about 5000 p. s. i. result in substantial conversion of ethylene to wax-like polymers.

The specific equipment and process flow details to be employed in carrying out the present invention do not form a part thereof. The process of the present invention may be effected in either batch or continuous flow equipment whose design is well known in chemical engineering practice.

The data obtained with the use of copper and silver synergists for lithium aluminum alkyl catalysts indicates that they function catalytically, since large rate increases are obtained in spite of the relatively small surface area of these metals. The data of Table 1, however, indicate that substantial rate increases may be obtained by surface effects, i. e., by the inclusion of inert materials preferably in the form of powders which do not affect the nature of the products or product distribution but which do substantially increase the rate at which the products are formed. In addition to the inert, rate-increasing materials shown in Table 1, I may use other inert powdered solids such as powdered glass, acetylene black, powdered iron, cobalt, nickel and the like. The catalytically inert, rate-increasing powders may have a particle size range of about 200 mesh per inch or finer and can be used in proportions between about 1 and about 20 grams or even more per gram of the polymerization catalyst. I can use both synergistic materials (Cu, Ag) and materials exerting surface effects to increase the rate of polymerization of olefins with the $AlR_3$ catalysts.

Having thus described my invention, what I claim is:

1. A process for preparing a liquid olefin polymer comprising substantially only terminal mono-olefins, which process comprises contacting an alpha-olefin having at least one hydrogen atom attached to the beta carbon atom with a catalyst comprising essentially a compound having the formula $AlR_3$, wherein R is selected from the class consisting of hydrogen and a monovalent hydrocarbon radical, and at least about 0.25 gram atom per gram mol of said catalyst of a promoter selected from the group consisting of elemental copper and silver under polymerization conditions, including a temperature in the range of about 80° C. to about 250° C.

2. The process of claim 1 wherein said $AlR_3$ catalyst is employed in the form of an alkali metal aluminum hydride and the polymerization temperature is between about 180° C. and about 250° C.

3. The process of claim 1 wherein said $AlR_3$ catalyst is employed in the form of an alkali metal aluminum alkyl and the polymerization temperature is between about 180° C. and about 250° C.

4. The process of claim 1 wherein said $AlR_3$ catalyst is employed in the form of lithium aluminum hydride and the polymerization temperature is between about 180° C. and about 250° C.

5. The process of claim 1 wherein said $AlR_3$ catalyst is employed in the form of a lithium aluminum alkyl and the polymerization temperature is between about 180° C. and about 250° C.

6. The process of claim 1 wherein said olefin is ethylene.

7. The process of claim 1 wherein said olefin is propylene.

8. The process of claim 1 wherein said olefin is 1-butene.

9. The process of claim 1 wherein polymerization is effected in the presence of a liquid reaction medium.

10. A process for the preparation of normally liquid polymers of ethylene comprising substantially only normal, terminal mono-olefins containing 6 to 16 carbon atoms, inclusive, in the molecule, which process comprises contacting ethylene with a catalyst comprising essentially an alkali metal aluminum hydride and at least about 0.25 gram atom per gram mol of said catalyst of a promoter selected from the group consisting of elemental copper and elemental silver at a polymerization temperature between about 180° C. and about 250° C. in the presence of a liquid reaction medium, and recovering said ethylene polymers thus produced.

11. The process of claim 10 wherein the ethylene partial pressure is between about 2500 and about 4500 p. s. i.

12. The process of claim 11 wherein the alkali metal is lithium.

13. A process for the preparation of normally liquid polymers of ethylene comprising substantially only normal, terminal mono-olefins containing 6 to 16 carbon atoms, inclusive, in the molecule, which process comprises contacting ethylene with a catalyst comprising essentially an alkali metal aluminum alkyl and at least about 0.25 gram atom per gram mol of said catalyst of a promoter selected from the group consisting of elemental copper and elemental silver at a polymerization temperature between about 180° C. and about 250° C. in the presence of a liquid reaction medium, and recovering said ethylene polymers thus produced.

14. The process of claim 13 wherein the ethylene partial pressure is between about 2500 and about 4500 p. s. i.

15. The process of claim 14 wherein the alkali metal is lithium.

References Cited in the file of this patent

UNITED STATES PATENTS

| | | |
|---|---|---|
| 2,210,148 | Indest | Aug. 6, 1940 |
| 2,699,457 | Ziegler et al. | Jan. 11, 1955 |
| 2,762,791 | Pease et al. | Sept. 11, 1956 |
| 2,781,410 | Ziegler et al. | Feb. 12, 1957 |

FOREIGN PATENTS

| | | |
|---|---|---|
| 504,161 | Belgium | July 14, 1951 |

UNITED STATES PATENT OFFICE

Certificate of Correction

Patent No. 2,871,276 January 27, 1959

James R. Eiszner

It is hereby certified that error appears in the printed specification of the above numbered patent requiring correction and that the said Letters Patent should read as corrected below.

Column 1, line 61, for "apparen tfrom" read —apparent from—; column 2, line 50, Table 2, for "1.0 g. LAH[1]" read —1.0 g. LAH[1] + 5.0 g.—.

Signed and sealed this 19th day of May 1959.

[SEAL]

Attest:

KARL H. AXLINE,
*Attesting Officer.*

ROBERT C. WATSON,
*Commissioner of Patents.*